United States Patent
Allen, Jr. et al.

(10) Patent No.: US 7,720,829 B2
(45) Date of Patent: May 18, 2010

(54) MIDDLEWARE SIGN-ON

(75) Inventors: Lloyd W. Allen, Jr., Cary, NC (US);
Tricia E. Garrett, Raleigh, NC (US);
Jana Helton Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/181,446

(22) Filed: Jul. 14, 2005

(65) Prior Publication Data

US 2007/0016792 A1  Jan. 18, 2007

(51) Int. Cl.
*G06F 17/00* (2006.01)
*G06F 3/048* (2006.01)
*G09G 5/08* (2006.01)

(52) U.S. Cl. .................. 707/705; 345/157; 345/168; 715/810

(58) Field of Classification Search ......... 715/784–787, 715/810; 345/156–157, 160, 168; 707/102
See application file for complete search history.

(56) References Cited

U.S. PATENT DOCUMENTS

| | | | | |
|---|---|---|---|---|
| 4,079,450 A | * | 3/1978 | Grimm et al. | 345/180 |
| 4,802,217 A | * | 1/1989 | Michener | 380/29 |
| 4,934,846 A | * | 6/1990 | Gilham | 400/104 |
| 5,010,323 A | * | 4/1991 | Hoffman | 345/178 |
| 5,226,148 A | * | 7/1993 | Littlewood | 714/50 |
| 5,452,413 A | * | 9/1995 | Blades | 715/786 |
| 5,479,536 A | * | 12/1995 | Comerford | 715/711 |
| 5,717,425 A | * | 2/1998 | Sasaki | 345/157 |
| 5,790,548 A | * | 8/1998 | Sistanizadeh et al. | 370/401 |
| 5,818,020 A | * | 10/1998 | Kabacaoglu et al. | 235/379 |
| 5,936,614 A | * | 8/1999 | An et al. | 345/173 |
| 5,963,671 A | * | 10/1999 | Comerford et al. | 345/168 |
| 6,056,193 A | * | 5/2000 | McAuliffe et al. | 235/380 |
| 6,243,816 B1 | * | 6/2001 | Fang et al. | 726/5 |
| 6,622,176 B2 | | 9/2003 | Jones et al. | 709/328 |
| 6,677,858 B1 | * | 1/2004 | Faris et al. | 340/573.1 |
| 7,116,317 B2 | * | 10/2006 | Gregorio et al. | 345/184 |
| 7,170,497 B2 | * | 1/2007 | Husgafvel et al. | 345/172 |
| 7,260,788 B2 | * | 8/2007 | Arai | 715/834 |
| 2002/0004853 A1 | * | 1/2002 | Jones et al. | 709/328 |
| 2002/0073093 A1 | * | 6/2002 | Aoyama et al. | 707/101 |

(Continued)

FOREIGN PATENT DOCUMENTS

JP          07210286 A  *  9/1995

*Primary Examiner*—Vincent Boccio
(74) *Attorney, Agent, or Firm*—Jeanine S. Ray-Yarletts, Esq.; Steven M. Greenberg, Esq.; Carey, Rodriguez, Greenberg & Paul, LLP

(57) ABSTRACT

An application for middleware sign-on is provided. A secure engine in the middleware generates a soft keyboard and scroll area. The scroll area includes coordinates associated with the soft keyboard. A selector is generated overlaid on the soft keyboard. The selector moves with respect to the soft keyboard in response to cursor movement within the scroll area. As the cursor movement causes the selector, the secure engine generates and stores false data key selections. When a user selects a data key with the selector, the middleware generates and stores the valid data key entry. The middleware stores both the valid data key selections and the false data key selections in the same area. Once the user submits his completed selection, or data, the middleware processes the data.

9 Claims, 7 Drawing Sheets

U.S. PATENT DOCUMENTS

| | | | |
|---|---|---|---|
| 2003/0014636 A1* | 1/2003 | Ahlbrand | 713/176 |
| 2003/0088829 A1* | 5/2003 | Itani | 715/513 |
| 2003/0106025 A1* | 6/2003 | Cho et al. | 715/523 |
| 2003/0110285 A1* | 6/2003 | Banerjee et al. | 709/236 |
| 2003/0159054 A1* | 8/2003 | Fauble et al. | 713/189 |
| 2004/0073809 A1* | 4/2004 | Wing Keong | 713/201 |
| 2004/0080529 A1 | 4/2004 | Wojcik | 345/738 |
| 2004/0104933 A1* | 6/2004 | Friedrich et al. | 345/751 |
| 2004/0104941 A1* | 6/2004 | Natoli | 345/772 |
| 2004/0139480 A1* | 7/2004 | Delpuch et al. | 725/135 |
| 2004/0143385 A1* | 7/2004 | Smyth et al. | 701/117 |
| 2005/0015571 A1* | 1/2005 | Kaufman et al. | 712/10 |
| 2005/0198121 A1* | 9/2005 | Daniels et al. | 709/203 |

\* cited by examiner

| Soft Keyboard | | | | | | | | | | | | | | | | | | | | | |
|---|---|---|---|---|---|---|---|---|---|---|---|---|---|---|---|---|---|---|---|---|---|
| Esc | F1 | F2 | F3 | F4 | | F5 | F6 | F7 | F8 | F9 | F10 | F11 | F12 | PrtScr | SysReq | ScrollLock | Pause | | | | Break |
| ~ | ! | @ | # | $ | % | ^ | & | * | ( | ) | _ | + | | Insert | PageUp | NumLock | / | * | | | - |
| ` | 1 | 2 | 3 | 4 | 5 | 6 | 7 | 8 | 9 | 0 | - | = | | | | | | | | | |
| TabR | Q | W | E | R | T | Y | U | I | O | P | { | } | | | Delete | End | PageDown | 7 Home | 8 Up | 9 PgUp | + |
| TabL | q | w | e | r | t | y | u | i | o | p | [ | ] | \ | | | | | 4 Left | 5 | 6 Right | |
| Caps | A | S | D | F | G | H | J | K | L | : | " | Enter | | | | | | 1 End | 2 Down | 3 PgDn | |
| | a | s | d | f | g | h | j | k | l | ; | ' | | | | | | | | | | |
| Shift | Z | X | C | V | B | N | M | < | > | ? | Shift | | | | | Up | | | | | |
| | z | x | c | v | b | n | m | , | . | / | | | | | | | | 0 Insert | | . Delete | |
| Ctrl | Win | Alt | | Space | | | | Alt | Win | Ctrl | | | | Left | Down | Right | | | | | |

FIG. 6

MIDDLEWARE SIGN-ON

BACKGROUND OF THE INVENTION

1. Field of the Invention

The invention relates generally to data processing systems. Specifically, the invention provides a method, system and computer program product for a secure middleware sign-on.

2. Description of the Related Art

The Internet, also referred to as an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies that must interact with virtually all segments of society, such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web." Other Internet resources exist for transferring information, such as File Transfer Protocol (FTP) and Gopher, but have not achieved the popularity of the Web. In the Web environment, servers and clients effect data transactions using the Hypertext Transfer Protocol (HTTP), a known protocol for handling the transfer of various data files. Examples of data files include text, still graphic images, audio, and motion video. The information in various data files is formatted for presentation to a user by a standard page description language, the Hypertext Markup Language (HTML).

In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page," is identified by a URL. The URL provides a universal, consistent method for finding and accessing this information, not necessarily for the user, but mostly for the user's Web "browser." A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet has revolutionized communications and commerce, as well as being a source of both information and entertainment. For many users, email is a widely used format to communicate over the Internet. Additionally, the Internet is also used for real-time voice conversations.

The Internet also is widely used to transfer applications to users of Web browsers. With respect to commerce on the Web, individual consumers and businesses use the Web to purchase various goods and services. In offering goods and services, some companies offer goods and services solely on the Web, while others use the Web to extend their reach.

Many Internet users are becoming disenchanted with the Internet because of security issues involving viruses and spyware. Some spyware programs can capture keystrokes and then send the captured data to the virus creator. This captured information serves as an aid in stealing the identity of the innocent Internet user, who uses the Internet for electronic commerce. Identity theft is a major problem. Computer hacking for the purpose of identity theft is considered an honorable profession in certain parts of the world where industry and scruples are scarce but intellect and the will to survive are abundant.

Providing security for Web access and Web transactions is a big industry. Some examples of current methods of providing security are using certificates of authenticity, the Common Criteria Certification (CCC) standard, Secure Sockets Layer (SSL) encryption, other types of encryption, and other forms of identity checking and protection, such as biometric sign-on. However, none of these security means provides a complete protection against viruses and spyware.

BRIEF SUMMARY OF THE INVENTION

The present invention provides a method, system, and computer program product for middleware sign-on. A soft keyboard and scroll area are displayed, wherein the scroll area includes coordinates associated with the soft keyboard. A selector is displayed and overlaid on the soft keyboard. The selector moves with respect to the soft keyboard in response to cursor movement within the scroll area. As the cursor movement causes the selector to move, false data key selections are generated and stored. When a user selects a key with the selecting mechanism, the valid data key entry is generated and stored. Both the valid data key selections and the false data key selections are stored in the same storage area. In response to a user request, all the stored data is processed.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a pictorial representation of a soft keyboard, in accordance with an exemplary embodiment of the present invention;

DETAILED DESCRIPTION OF THE INVENTION

Figure 1:
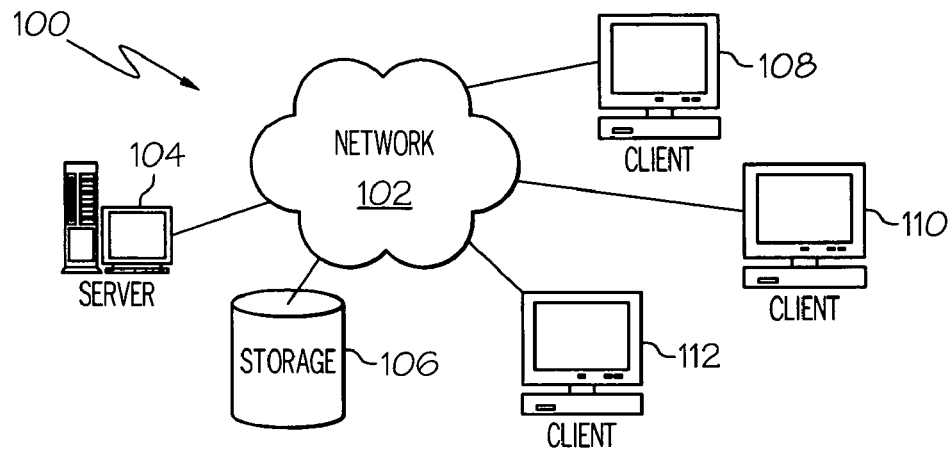
FIG. 1 is a pictorial representation of a network of data processing systems in which exemplary aspects of the present invention may be implemented.
Figure 2:
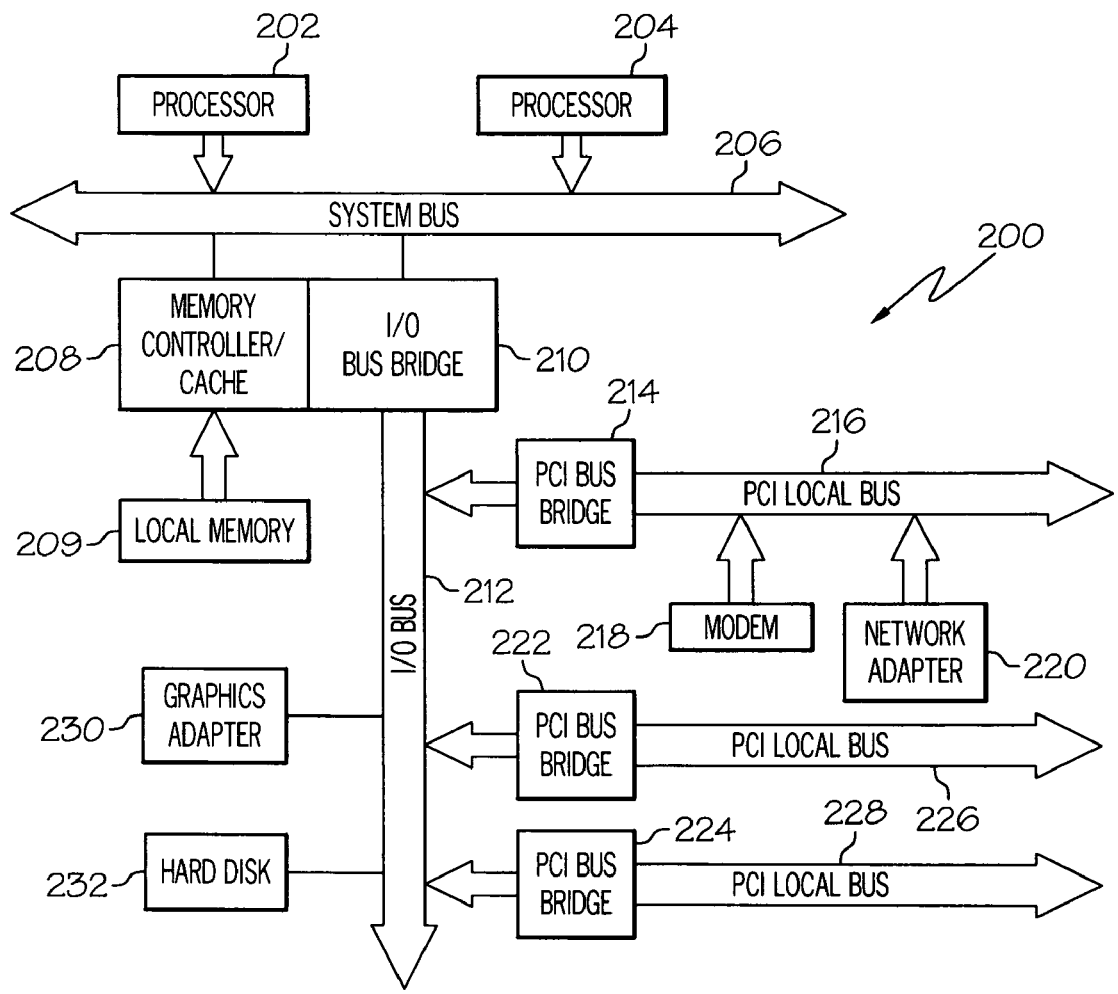
FIG. 2 is a block diagram of a data processing system that may be implemented as a server, in accordance with illustrative embodiments of the present invention.
Figure 3:
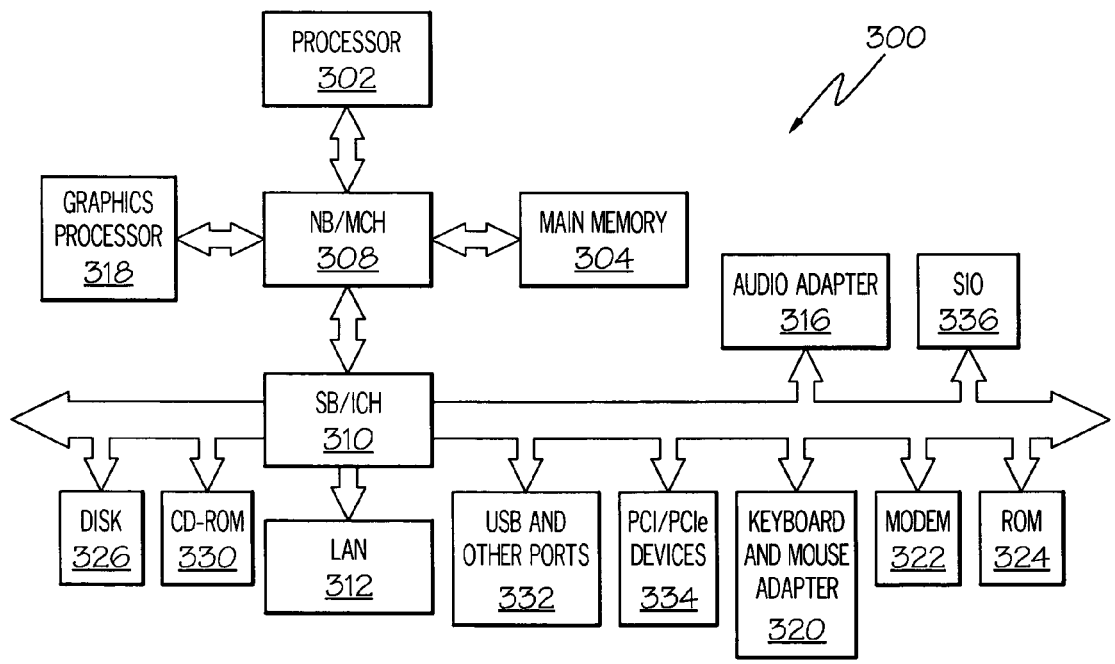
FIG. 3 is a block diagram of a data processing system in which exemplary aspects of the present invention may be implemented.

FIGS. 1-3 are provided as exemplary diagrams of data processing environments in which exemplary aspects of the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 to provide an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or Linux operating system (eServer, pSeries and AIX are trademarks of International Business Machines Corporation in the United States, other countries, or both, while Linux is a trademark of Linus Torvalds in the United States, other countries, or both).

With reference now to FIG. 3, a block diagram of a data processing system is shown in which exemplary aspects of the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read-only-memory (ROM) 324, hard disk drive (HDD) 326, CD-ROM driver 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as the Microsoft® Windows® XP operating system (Microsoft and Windows are trademarks of Microsoft Corporation in the United States, other countries, or both). An object oriented programming system, such as the Java™ programming system, may run in conjunction with the operating system and provide calls to the operating system from Java™ programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system. As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as that found in memory controller/cache 208 of FIG. 2 or main memory 304 of FIG. 3. A processing unit may include one or more processors or central processing units, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Figure 4:
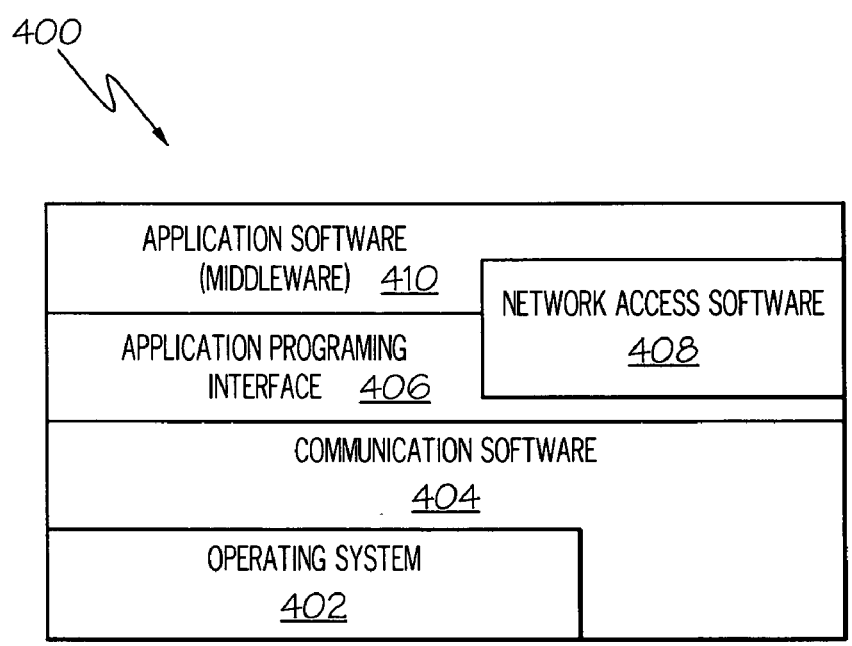
FIG. 4 is a block diagram of a typical software architecture for a server-client system in accordance with an exemplary embodiment of the present invention.

Turning to FIG. 4, typical software architecture for a server-client system, such as system 100 in FIG. 1, is depicted in accordance with an exemplary embodiment of the present invention. At the lowest level, operating system 402 is utilized to provide high-level functionality to the user and to other software. Such an operating system typically includes a basic input output system (BIOS). Communication software 404 provides communications through an external port to a network such as the Internet via a physical communications link by either directly invoking operating system functionality or indirectly bypassing the operating system to access the hardware for communications over the network.

Application programming interface (API) 406 allows the user of the system, an individual, or a software routine, to invoke system capabilities using a standard consistent interface without concern for how the particular functionality is implemented. Network access software 408 represents any software available for allowing the system to access a network. This access may be to a network, such as a local area network (LAN), wide area network (WAN), or the Internet. With the Internet, this software may include programs, such as Web browsers.

Application software 410 represents any number of software applications, including middleware applications, designed to react to data through the communications port to provide the desired functionality the user seeks A middleware application is software that manages the communication between disparate applications, typically across heterogeneous platforms. The communication may be from application program to application program, from database to database, from a client program to a database, or from an application program to a network. For example, a Web server connected to a database may be considered middleware, as the server sits between the client program, a Web browser, and a database. The middleware allows the database to be changed without necessarily affecting the client program, and vice-versa. Another example of middleware is an Object Request Broker, which is software that manages communications between objects. Applications at this level may include those necessary to handle data, video, graphics, photos or text, which can be accessed by users of the Internet. The mechanism of the present invention may be implemented within communications software 404 in these examples.

Figure 5:
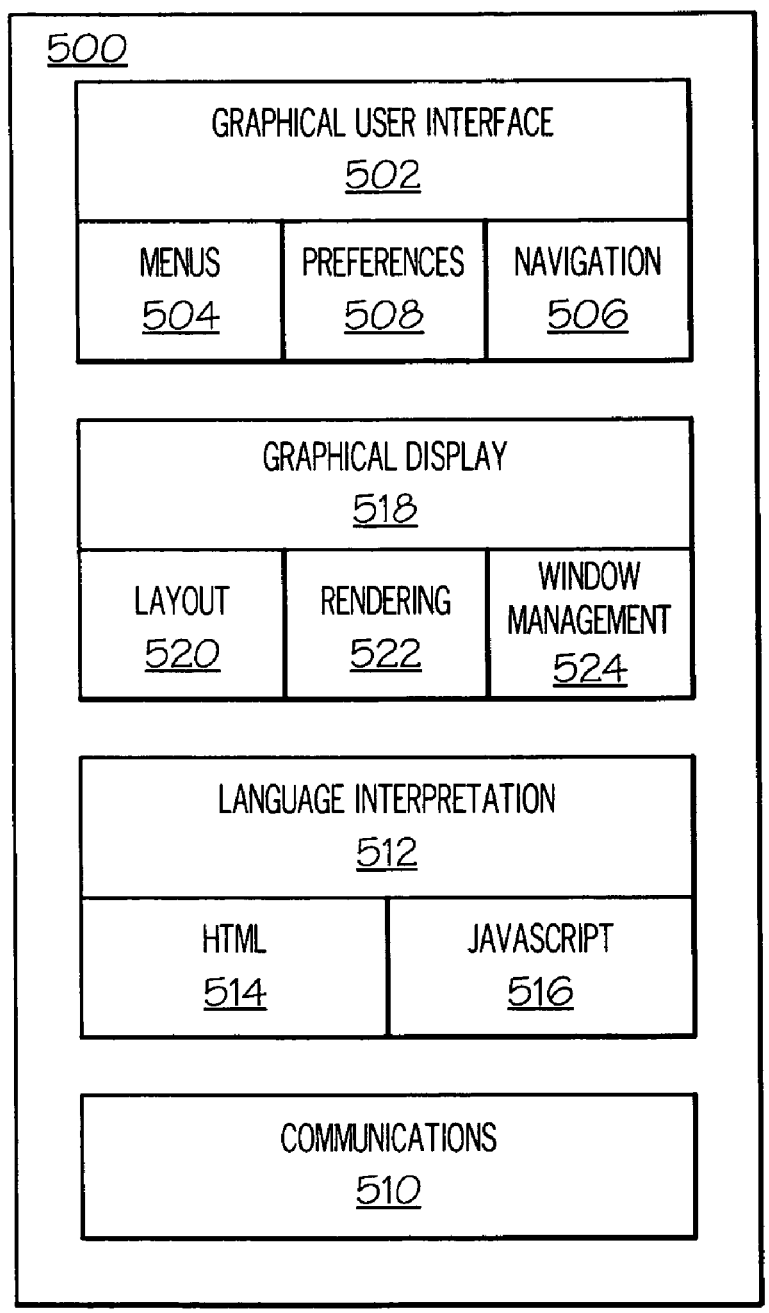
FIG. 5 is a block diagram of a browser program in accordance with an exemplary embodiment of the present invention.

Turning next to FIG. 5, a block diagram of a browser program is depicted in accordance with an exemplary embodiment of the present invention. A browser is an application used to navigate or view information or data in a distributed database, such as the Internet or the World Wide Web.

In this example, browser 500 includes a user interface 502, which is a graphical user interface (GUI) that allows the user to interface or communicate with browser 500. This interface provides for selection of various functions through menus 504 and allows for navigation through navigation 506. For example, menu 504 may allow a user to perform various functions, such as saving a file, opening a new window, displaying a history, and entering a URL. Navigation 506 allows for a user to navigate various pages and to select Web sites for viewing. For example, navigation 506 may allow a user to see a previous page or a subsequent page relative to the present page. Preferences such as those illustrated in FIG. 5 may be set through preferences 508.

Communications 510 is the mechanism with which browser 500 receives documents and other resources from a network such as the Internet. Further, communications 510 is used to send or upload documents and resources onto a network. In the depicted example, communications 510 uses HTTP. Other protocols may be used depending on the implementation. Documents that are received by browser 500 are processed by language interpretation 512, which includes an HTML unit 514 and a JavaScript unit 516. Language interpretation 512 will process a document for presentation on graphical display 518. In particular, HTML statements are processed by HTML unit 514 for presentation while JavaScript statements are processed by JavaScript unit 516.

Graphical display 518 includes layout unit 520, rendering unit 522, and window management 524. These units are involved in presenting Web pages to a user based on results from language interpretation 512.

Browser 500 is presented as an example of a browser program in which the present invention may be embodied. Browser 500 is not meant to imply architectural limitations to the present invention. Presently available browsers may include additional functions not shown or may omit functions shown in browser 500. A browser may be any application that is used to search for and display content on a distributed data processing system. Browser 500 may be implemented using known browser applications, such as Netscape Navigator or Microsoft Internet Explorer. Netscape Navigator is available from Netscape Communications Corporation while Microsoft Internet Explorer is available from Microsoft Corporation.

Middleware can use a middleware sign-on process to further protect the account sanctity of a user when the user is signing on to the normal consumer stream of Web commerce. Banks, credit cards, catalog store fronts, and other consumer financial entities can benefit from a middleware sign-on process, but middleware sign-on processes could also enhance security standards such as the Common Criteria Certification.

The middleware sign-on process provides both a Web application and a configurable run-time engine for securing user data provided during the user sign-on process. Middleware application servers can use the Web application to display a clickable interface, such as a keyboard, or a less recognizable matrix of characters, icons, sounds, and/or colors. The middleware displays the clickable middleware sign-on process interface with encrypted or random links so that viewing the source of the page would not reveal the underlying meaning. The page could be created in any mark-up language, such as HTML or XML.

In an exemplary embodiment of the present invention, a cursor moves in a scroll area that is separate from the soft keyboard. The scroll area comprises a graphical interface, in any shape, with encrypted coordinates that are meaningless to an eavesdropper. In an exemplary embodiment of the present invention, the scroll area is circular. As the cursor moves, the selection "crosshair" moves across a soft keyboard. A particular key is selected by being under the crosshair at the time that the user selects the left mouse button (button up). As the crosshair moves across the keyboard, the middleware generates encrypted pseudo-selection entries in the selection interface to camouflage real selections. The middleware software keeps a record of pseudo entries and strips out the pseudo entries later, when comparing the entered password or account data to the real password or account data. The user selects a submit button after entering their password, which generates a request to process the stored data. The false data key selections are stripped out during the processing.

A secure engine in the middleware generates the encrypted or random codes for each particular sign-on session and also interprets the input. The engine is both configurable and versatile. The engine can generate anything currently supported by the computer on which it runs. For example, the engine could generate holographic three-dimensional identifiers, if the computer on which it ran supported this form of identification.

Clicking a particular letter, number, icon, sound, or color in the interface for the middleware sign-on process would simply store the encrypted or random link value in the password variable until all of the password characters are clicked. The secure engine in the middleware verifies the sign-on provided and flushes the data. The user proceeds to the Web site if the sign-on was successful or asks for another middleware sign-on process or another interface for the middleware sign-on process if the sign-on was not successful. The second and succeeding interfaces for the middleware sign-on process each use different random or encrypted link data.

The middleware sign-on process provides the advantage of allowing the application server to provide security in an inviolable computing environment. Use of the middleware sign-on process removes any reliance on operating systems or browser software to protect keystrokes from being captured. Use of the middleware sign-on process removes the ability of spyware to spy on the user's password.

Turning now to FIG. 6, a pictorial representation of a soft keyboard is shown in accordance with an exemplary embodiment of the present invention. Soft keyboard 600 shows crosshair 602 as an overlay on soft keyboard 600. Selection square 604 shows which key would be selected by pressing a submit or an enter button. In the present example, selection square 604 is centered over the letter T, shown in bold type. Any sort of selection mechanism, or selector, is considered part of the invention. In the present example a crosshair is used that highlights all the keys covered by the crosshair and highlights the key to be selected with a square. However, the crosshair could result in just one highlighted key, perhaps with a box around it, or the key could be highlighted a different color, or a cross might appear only over the character to be selected. Similarly, a circle or any other kind of indicator could be used to show which key is to be selected.

The user left mouse button up is configurable in the middleware. The middleware can respond to either half-click or to a full click of the left, center, or right button.

The interval for the middleware to change the encryption algorithm is configurable, as is the encryption algorithm or algorithms. Each key selection and pseudo selection can result in a configurable number of characters. For example, if a user selects T as shown in soft keyboard 600, the resulting number of encrypted characters could be anywhere from 1 character to whatever number is selected. A user could configure each key selection to be 128 encrypted characters or 256 characters. Although a stream for an 8-character password might be thousands of encrypted characters from pseudo and real key selections, the IT group would configure the middleware based on the reality of network transmission speed, processor computing capacity, and other variables to determine an optimal balance of security and user response time. In general, the faster the network and the computer, the more secure the application could be and the less vulnerable to programmatic attack from hackers.

Any application can use the soft keyboard and encryption method for sensitive data by locking keyboard output and forcing a user to select sensitive account data or password from the soft keyboard. The application can allow mechanical keyboard input for non-sensitive data. For example, after the user logs on to their online banking application with the soft keyboard, the bank application can allow the user to send a note to the bank using a mechanical, non-encrypted keyboard.

Figure 7:
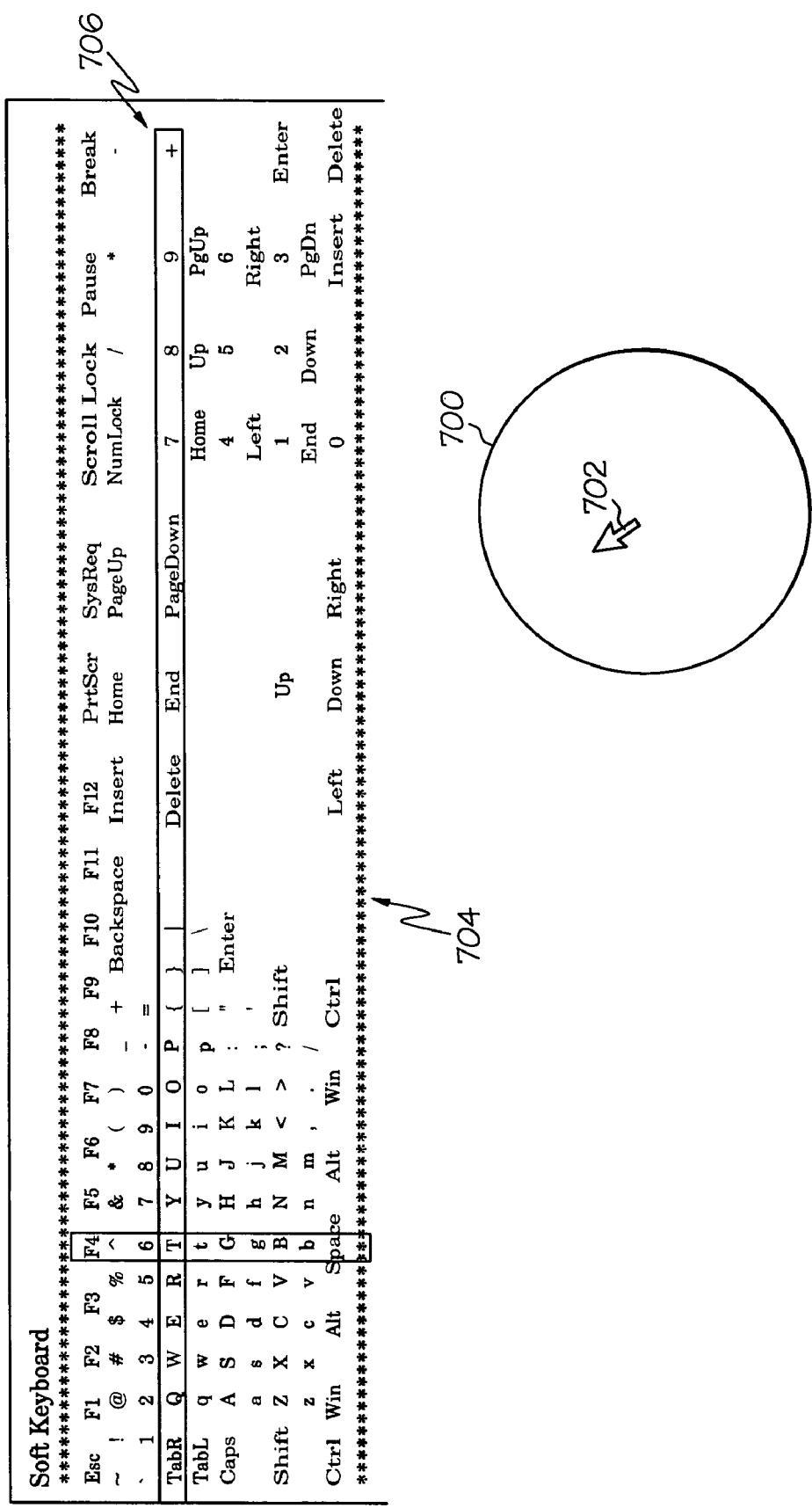
FIG. 7 is a pictorial representation of a scroll area and a soft keyboard, in accordance with an exemplary embodiment of the present invention.

FIG. 7 is a pictorial representation of a scroll area and a soft keyboard, in accordance with an exemplary embodiment of the present invention. Scroll area 700 and soft keyboard 704 are generated by middleware implemented in a data processing system, such as data processing system 200 in FIG. 2. Soft keyboard 704 may be static and does not need to float in a field. Soft keyboard 704 does not have to be randomly generated at each use of the middleware sign-on process. However, depending upon the implementation, both soft keyboard 704 and scroll area 700 may be randomly generated for each use of the middleware sign-on process.

Two mechanisms are necessary to select a key of soft keyboard 704: a selector, such as crosshair 706, superimposed on soft keyboard 704 and separate scroll area 700. All mouse activity occurs in scroll area 700. In an exemplary embodiment, scroll area 700 is circular in shape.

In an exemplary embodiment of the present invention, a cursor, controlled by a mouse, moves in scroll area 700, which is separate from soft keyboard 704. Scroll area 700 relates cursor movement to soft keyboard 704. The user does not need to move the cursor to soft keyboard 704 to select a key. In an exemplary embodiment of the present invention, moving the cursor to soft keyboard 704 does not permit the user to select a key. The user is only able to select a key through use of a selector, such as crosshair 706. The scroll area comprises a graphical interface, in any shape, with randomly generated coordinates that are meaningless to an eavesdropper. The randomly generated coordinates may vary with each key entry, including false entries and real entries. Or, the random coordinates can change after every 5 or 10 key entries. The size, shape and border of scroll area 700 are configurable. The coordinates of scroll area 700 may be encrypted. Small movements in scroll area 700 can cause small, medium, or large movements of crosshair 706 on soft keyboard 704, depending upon the particular implementation. The movement amplification is configurable.

As the cursor moves across scroll area 700, as indicated by arrow 702, selection crosshair 706 moves across soft keyboard 704. A user selects a particular key of soft keyboard 704 by selecting the left mouse button (button up) when crosshair 706 is over that particular key. As crosshair 706 moves across soft keyboard 704, the middleware generates encrypted pseudo-selection entries in the selection interface to camouflage real selections. The pseudo-selection entries may be generated every time the selector passes over a key, at random intervals or at regular, timed intervals. The middleware software keeps a record of pseudo entries and strips out the pseudo entries later, when comparing the entered password or account data to the real password or account data. The user selects a submit button after entering their password, which generates a request to process the stored data. The false data key selections are stripped out during the processing.

Encryption on the selected keys is configurable. Each key on the soft keyboard can select a sequence of characters. The number of characters generated by the encryption algorithm is configurable, as was discussed in regard to FIG. 6.

Figure 8:
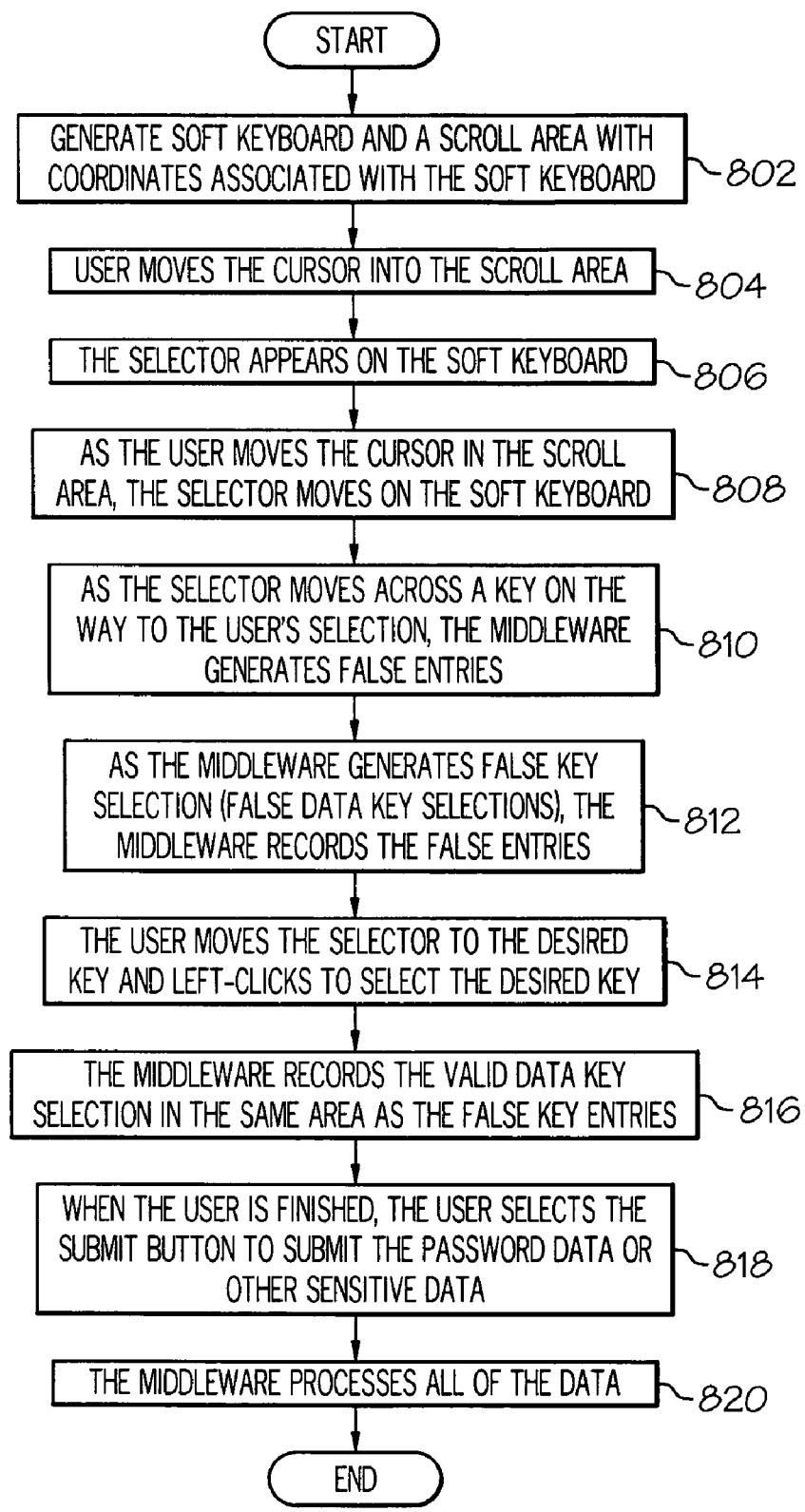
FIG. 8 illustrates operation of a middleware sign-on process in accordance with an exemplary embodiment of the present invention.

FIG. 8 illustrates operation of a middleware sign-on process in accordance with an exemplary embodiment of the present invention. The operation begins when the middleware, which can be implemented as application software, such as application software 410 in FIG. 4, generates and displays a soft keyboard and a scroll area with coordinates associated with the soft keyboard on a graphical user interface to a user (step 802). A user moves a cursor into the scroll area (step 804). The selector appears on the soft keyboard (step 806). As the user moves the cursor in the scroll area, the selector moves on the soft keyboard (step 808). As the selector moves across a key on the way to the user's selection, the middleware generates false entries (step 810). As the middleware generates the false data key selections, the middleware records the false entries (step 812). The user moves the selector to the desired key and left-clicks to select the desired key (step 814). The middleware records the valid data key selection in the same area as the false key entries (step 816). The false data key selections combined with valid data key selections form protected data. When the user is finished making all of the user's selections, the user selects the submit button to submit a request to process the password data or other sensitive data (step 818). The middleware processes all of the protected data (step 820), and the operation ends.

In order to process the protected data, the middleware strips out the false data key selections based on what it has generated. As the middleware has kept a record of the false data key selections, the middleware is able to remove, or strip out, those entries, leaving only the valid data key selections. In the case of passwords and saved account numbers, the middleware compares the data to a saved password to determine validity. For sensitive new data such as account numbers, the middleware records the stripped data as the value of the appropriate collection field.

If the user enters a valid password for an account, the middleware displays the next screen in the application, such as the Welcome panel for an Internet banking application.

In another exemplary embodiment, the middleware may display a screen informing the user that an incorrect or invalid entry has been made and allow the user an opportunity to re-enter the data. A limit may be set for the number of times a user may enter incorrect or invalid data before the user is no longer allowed to enter data.

In a further exemplary embodiment, each time the user re-enters data, either a new keyboard, a new scroll area, or both are generated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for middleware sign-on, the computer implemented method comprising:
displaying a soft keyboard and a scroll area that is separate from the soft keyboard, wherein the scroll area includes coordinates associated with the soft keyboard;
displaying a selector, wherein the selector moves with respect to the soft keyboard in response to cursor movement within the scroll area;
generating and storing valid data key selections in response to a selection of a data key in the soft keyboard using the selector;
generating and storing false data key selections in response to the cursor movement in the scroll area, wherein the valid data key selections and the false data key selections are stored in a same storage area to form protected data; and
processing the protected data in response to a user request.

2. The computer implemented method of claim 1, wherein processing the protected data in response to the user request comprises:
removing the false data key selections from the protected data to form sensitive data.

3. The computer implemented method of claim 2, further comprising:
comparing the sensitive data to a saved password to determine validity of the sensitive data.

4. The computer implemented method of claim 2, further comprising:
storing the sensitive data as a value of an appropriate collection field.

5. The computer implemented method of claim 1, wherein each data key of the soft keyboard is encrypted and wherein each false data key selection is encrypted.

6. The computer implemented method of claim 5, wherein the encryption varies between the data keys of the soft keyboard and between the false data key selections.

7. The computer implemented method of claim 1, wherein the coordinates of the scroll area are randomly generated to form random coordinates.

8. The computer implemented method of claim 7, wherein the random coordinates are encrypted.

9. The computer implemented method of claim 8, wherein the encryption varies between the random coordinates.

* * * * *